ELECTRONIC AMPLIFIERS

Filed March 31, 1952

Inventor: Joseph Taïeb;
By his attorneys,
Baldwin & Wight

United States Patent Office 2,793,256
Patented May 21, 1957

2,793,256

ELECTRONIC AMPLIFIERS

Joseph Taïeb, Paris, France, assignor to Commissariat a l'Energie Atomique, Paris, France, a corporation of France Application March 31, 1952, Serial No. 279,664

Claims priority, application France April 7, 1951

5 Claims. (Cl. 179—171)

The present invention concerns electronic amplifiers and more particularly amplifiers for the amplifying of low currents supplied by a source with a high internal resistance.

It is known that electronic amplifiers amplify, together with the input signal introduced as a voltage or as a current, parasite currents or voltages called noises. In the case of amplifiers designed for the amplification of low currents supplied by a source with a high internal resistance, the input noise, expressed as a current, consists of two main terms, namely the grid current of the input tube of the amplifier, or its fluctuations, according to the frequency band which is amplified, a term which, for a given frequency band, is independent of the value of the input resistor, and the thermal agitation noise in the input resistor, which shows as a current through that resistor, a current which is inversely proportional to the square root of the value of that resistor.

When very low intensity signals have to be amplified, the signal/noise ratio may be too low to enable a suitable discrimination of the signal from the output noise of the amplifier. This offers a serious drawback, particularly in devices designed for detecting low intensity signals such as those resulting from the operation of a mass spectrograph or an ionization chamber for instance.

An object of the present invention is an improvement in low current amplifiers, making it possible to improve the signal noise ratio in these amplifiers and consequently their sensitivity.

The input signal in such amplifiers is a current which is independent of the input resistance of the amplifier. On the contrary, as explained above, one of the two input noise main terms decreases when said resistance increases.

The input signal/noise ratio and consequently the same output ratio in low current amplifiers can thus be improved under the condition of increasing the value of the input resistance on the one hand and, on the other hand, of decreasing the grid current in the input tube and its fluctuations by a suitable choice of the type of said tube, which decreases, at the same time, the two main terms of input noise, without acting on the signal.

If an input circuit of a conventional type is used, however, the increase in the value of the input resistance determines an increase in the time constant of the input circuit, therefore in the time necessary for measurement. The increase in the value of the input resistance is thus limited by a consideration of the time which is necessary for measurement.

It may be shown that the use of a negative feedback circuit makes its possible to decrease the time constant of the input circuit which may be written.

(1) $$\tau=R\left(\frac{C_1}{A}+C_0\right)$$

provided (2) $$\Gamma<\frac{C_1}{A}+C_0$$

In the above relationships, $C_1$ is the input capacity of the amplifier, $C_0$ is the capacity across terminals of the input resistor R, $\Gamma$ the sum of the distributed capacities along this resistor and A is the gain, in voltage, of the chain formed formed by the amplifier and the negative feedback circuit.

These relationships show that the negative feedback makes it possible, by the choice of a sufficiently high amplifier gain, to decrease the term $$\frac{C_1}{A}$$

at will but that it remains without any effect on the terms $C_0$ and $\Gamma$.

In order to substantially improve the signal/noise ratio in an amplifier having a negative feedback circuit, by using an input resistance of a much higher value than in conventional amplifiers, without increasing at the same time, the time constant of the input circuit to an unacceptable degree, it is necessary, therefore, to decrease the value of the above mentioned term $C_0$. This decrease possibility is limited only by the existence of the term $\Gamma$ and the necessity of satisfying the Inequality 2.

Since too large a decrease in $C_0$, when the term $$\frac{C_1}{A}$$

has been made very small, could make it impossible to satisfy the Inequality 2, there is an obvious interest in being able to also decrease, in the largest possible proportions, the term $\Gamma$.

The invention precisely, has as an object, a process which makes it possible to reduce to extremely low values, by compensation, both the term $C_0$ and the term $\Gamma$.

It will be realized that by such a process which makes it possible to combine, on the one hand, the reduction of $$\frac{C_1}{A}$$

and, on the other hand, those of $C_0$ and $\Gamma$, it is possible to obtain a set in which, while keeping the time constant $\tau$ of the input circuit to a low value and satisfying the Inequality 2, a high value input resistance can be used, which provides a very important improvement of the signal/noise ratio and, consequently, of the sensitivity.

The process according to the present invention fundamentally consists in establishing, in the space surrounding the input resistor, a compensating electric field of such a configuration that the potential at any point of the surface of said resistor and the potential of the point immediately adjacent to the space surrounding the latter be substantially equal.

The surface charges assumed by the input resistor are thus practically null and the phenomena of exchange of electrostatic energy with the surrounding space and, consequently the capacity across the terminals of the resistor and the capacities which are distributed along the latter, are reduced to a minimum.

Practical embodiments of a compensating field according to the above process may be created by numerous means. To this effect, a hollow resistance or an assembly of resistances surrounding the measurement resistance may, for instance, be used. The field may also be established by a set of two or more plates through which the input resistor extends perpendicularly connected to sources of electricity capable of raising their potentials to the values which are necessary to provide the desired compensating field.

The invention is described in greater detail hereinafter with reference to the accompanying drawings, wherein.

Figures 1, 2, 3, 4, 5, 6, 7, 8:
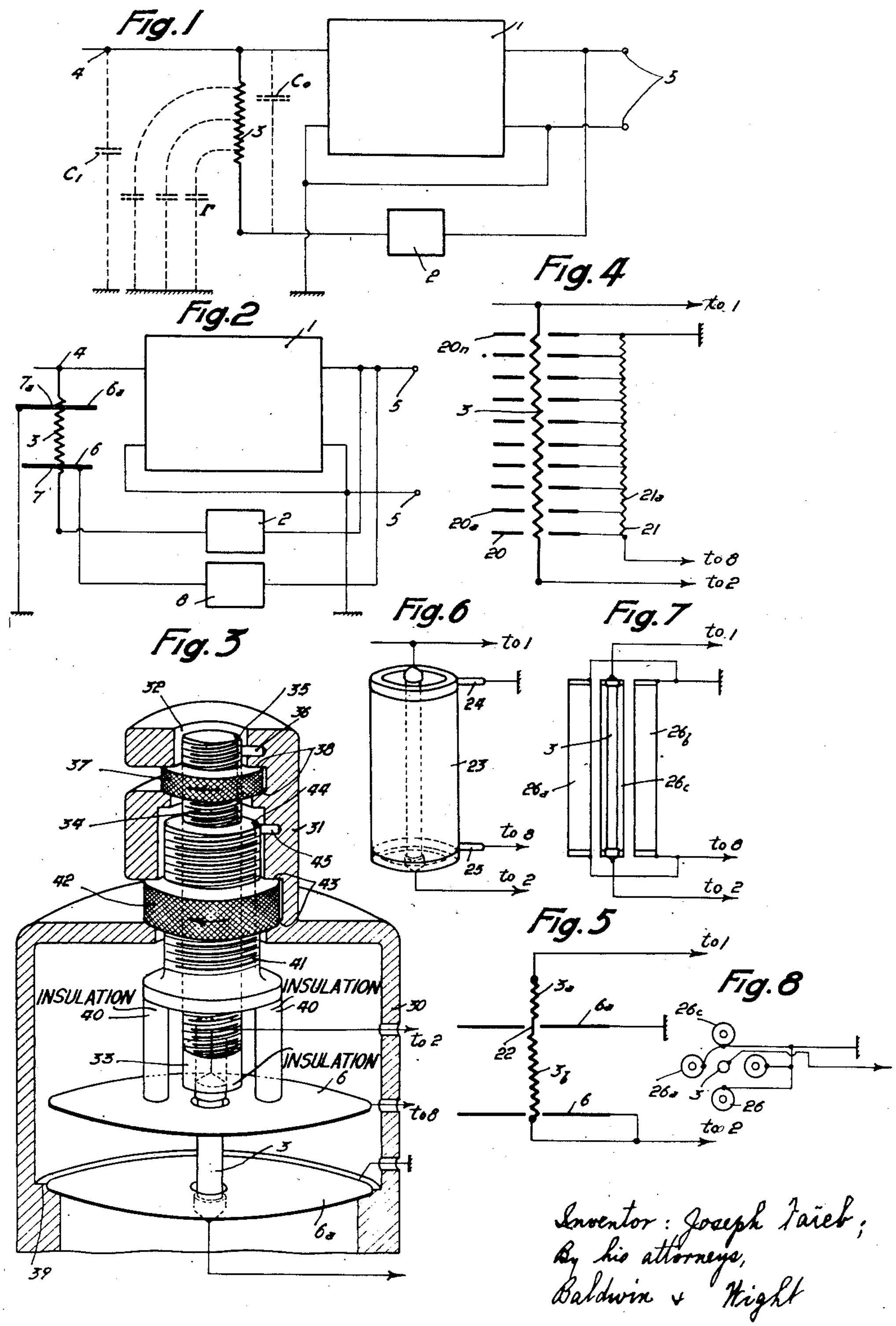
Fig. 1 is a diagrammatic illustration of a conventional amplifier provided with a negative feedback circuit.
Fig. 2 is a similar diagram of an amplifier, improved according to the present invention.
Fig. 3 is a diagrammatic perspective view of an embodiment, of a plate field compensating device.
Fig. 4 is a diagrammatic longitudinal section of a multiple plate field compensating device.
Fig. 5 is a diagrammatic section of another modification of the invention of Fig. 3.
Fig. 6 is a perspective diagrammatic view of another embodiment of a field compensating device making use of a resistor.
Fig. 7 is a diagrammatic vertical section of a modification of the type of embodiment of Fig. 6.
Fig. 8 is an end view of the arrangement shown in Fig. 7.

In the diagram of Fig. 1, reference character 1 designates an amplifier with a gain $\mu$, associated with a negative feedback circuit 2 having a gain $\beta$. The input resistor of the amplifier, having a value R, is shown at 3. In addition, the input capacity $C_1$ of the amplifier, the capacity $C_0$ across the terminals of resistor 3 and the sum $\Gamma$ of the capacities distributed along resistor 3 appear in broken lines.

The current $i_0$ to be amplified, is applied to the input terminal 4 of the amplifier and the amplified voltage $U_s$ is obtained, at the output terminals 5 of the latter.

As explained above, the term $$\frac{C_1}{A}$$

in the Equation 1 may be made as small as desired, by determining the characteristics of amplifier 1 and of the negative feedback circuit 2 in such a manner that the gain $A=\mu\beta$ of the chain consisting of amplifier 1 and circuit 2 be sufficiently important with respect to $C_1$.

According to the present invention, the terms $C_0$ and $\Gamma$ are also reduced to a minimum by creating, around resistor 3, a compensating field E in order that the potential at any point on the surface of said resistor and that at the point immediately adjacent to the space surrounding said resistor be equal.

Fig. 2 shows the arrangement of an amplifier similar to that shown in Fig. 1, in which an assembly of two plates raised to determined potentials is made use of in order to create this compensating field. In this figure, the elements which are identical with those of Fig. 1 are designated by the same references. In order to work out the present invention, two conducting plates 6 and **6*a*, provided with a central aperture 7, 7*a*, are arranged in parallel relation, in the vicinity of each end of resistor 3, which goes through apertures 7 and 7*a*, perpendicularly to the planes of the two plates. The diameter of apertures 7 and 7*a* is only slightly larger than that of resistor 3**.

Plate 6 is connected to the output of a negative feedback chain 8 associated with amplifier 1, while plate **6*a* is grounded, the characteristics of the feedback chain 8 being so determined that plate 6 be raised to such a potential V that the desired electric field E is established between plates 6 and 6*a***.

The adjustment of the compensating field, once potential V has been selected, may be effected by adjusting the axial position of plates 6 and **6*a*, with respect to resistor 3. The same result is obtained in adjusting the axial position of plate 6 and of resistor 3 with respect to plate 6*a* which remains fixed. A device providing a practical embodiment of this adjustment is shown in Fig. 3 in which resistor 3, and the two plates 6 and 6*a*, are to be seen, plate 6*a***, which is grounded, being the lower plate.

The whole device is contained in a cylindrical metal casing 30, extended by an extension 31, provided with an axial bore 32.

Resistor 3 is mounted by means of an insulating ring 33, at the end of a threaded rod 34, which passes freely in bore 32 and which is provided with a longitudinal groove 35, which cooperates with a stud 36 which immobilizes said rod in rotation, with respect to extension 31, while allowing the longitudinal displacement of said rod.

On rod 34 there is engaged a knurled internally screw threaded control knob 37, longitudinally immobilized between shoulders 38 provided inside extension 31.

Plate **6*a* rests on a shoulder 39 provided in casing 30 and plate 6 is secured, by means of insulating pillars 40 at the end of a sleeve 41 which is outwardly threaded and mounted so as to be capable of sliding on rod 34**.

A knurled control knob 42, longitudinally immobilized between two shoulders 43, provided in bore 32, is screw threadedly engaged with sleeve 41, which, similarly to rod 34 is provided with a longitudinal groove 44 cooperating with a stud 45 which immobilizes said sleeve 41 in rotation.

Any rotation of the knob 37 results in a translation of rod 34, hence of resistors 3 with respect to plate **6*a*. Similarly, any rotation of the knob 42 results in a translation of sleeve 41; hence of plate 6 with respect to resistor 3 and plate 6*a***.

The electrical connections appear diagrammatically, in Fig. 3, in order to simplify the drawing.

As an embodiment of the invention, the plate device shown in Fig. 3 has been used, in combination with a resistor 3, trademark "Vitrohm," of a value of 600 megohms, of 300 mm. in length and constituting the input resistor for an amplifier having a gain of 10,000, the input tube of which was of the type 6AJ5, mounted as a pentode. Capacitor $C_1$, at the input of the amplifier was of 100 $\mu\mu$f.

With a conventional set, i. e. without plates 6 and **6*a*, the width of the pass band was of 25 cycles per second, and the system was unstable owing to phase variations along resistor 3**.

By using plates 6 and **6*a*, the first one of which was connected with the same negative feedback circuit as resistor 3** and the second one of which was grounded, the distance between the two plates having been adjusted to 273 mm., it was possible to extend the width of the pass band up to 20,000 cycles per second.

With a resistor 3 of 100,000 megohms, trademark "Welwyn," combined with a plate 6 connected with a negative feedback circuit 8 and a grounded plate **6*a***, it was possible to extend to 500 cycles per second the pass band of a set comprising an amplifier with a gain of 12,000 and a negative feedback circuit. The input tube was a "Hivac XE1" tube, the input capacity C of the setup was equal to 25 $\mu\mu$f. The pass band of such a set is of 6 cycles/sec. The pass band of the same set with the negative feedback circuit but without any plates is of the order of 50 cycles/sec. In this case it varies in an important degree with the arrangement of the connections to the terminals of the resistor. Further, in the absence of plates, signal deformations are observed at the lowest frequencies in the pass band. These drawbacks are eliminated by the use of plates.

It was found possible to decrease the background noise, expressed as a current, by the use of plates, for the above mentioned 500 cycles pass band to a value of $3\times10^{-14}$ ampere R. M. S.

Instead of using two plates 6 and **6*a*, as described above, it is possible, as shown in Fig. 4, to arrange, around resistor 3 a plurality of plates 20, 20*a* . . . 20*n*, raised to suitable potentials, for instance by means of potentiometric resistors 21, 21*a***, etc.

By way of example of an embodiment of the invention, the plate device shown in Fig. 4 has been used, in combination with a resistor 3 of 100,000 megohms, trademark Welwyn. The set comprises an amplifier with a gain of 12,000, the input tube was a "Hivac XE1" tube;

the input capacity was of 25 μμf. The data obtained were the same as when using the two-plate system, the dimensions of the multiple plate system, however, being smaller. The device included eleven plates, 20, **20*a*, etc., and ten potentiometric resistors 21, 20*a***, etc., of 100,000 ohms.

One may also use, as in Fig. 3, two plates 6 and **6*a* the input resistor (Fig. 5) being divided into two parts 3*a* and 3*b*, the first one outside plates 6 and 6*a* and the second one between these plates. Resistor 3*a* should then offer a value $R_1$ which, with respect to the value $R_2$ of resistor 3*b***, should be such that $$R_1 = \frac{R_2}{A}$$

It may be shown that, in these conditions, connection 22, which connects the two parts **3*a* and 3*b* of the resistor is at a potential very close to that of the ground and may without any drawback, belong in the vicinity of the ground. Plate 6*a* being grounded, plate 6 is, in such a case, connected with the end of resistor 3*b*, which is connected with the negative feedback circuit 2 and the parasite capacities are brought to a value which is nule provided the resistance per unit of length be constant along portion 3*b*** of the resistor.

By way of example of this embodiment of the invention, the device shown in Fig. 5 has been used, with the following values:

3*a*=70 megohms
3*b*=1,000,000 megohms

The input tube was a "Hivac XE2" tube, the input capacity of the set C, was equal to 10 μμf. The set comprised an amplifier with a gain of 15,000. The pass band of such a set, without any negative feedback, is 16 cycles/sec. The application of the device shown in Fig. 5 made it possible to raise the pass band to 150 cycles per second. The background noise, expressed as a current, was cut down, by the same means to $5 \times 10^{-15}$ ampere R. M. S.

The compensating field may also be established by means of auxiliary resistors surrounding the resistor 3. Thus, in Fig. 6, resistor 3 is arranged inside a hollow resistor 23, the terminal 24 of which, located on the side of the input to the amplifier, is grounded, while its other terminal 25 is connected to any source of electricity, for instance a negative feedback chain such as 8 (Fig. 2), capable of raising it to the required potential so that the necessary field be created inside resistor 23.

The hollow resistor 23 may, as shown in Figs. 7 and 8 be replaced by auxiliary resistors 26, **26*a*, 26*b*, 26*c*, arranged in parallel with resistor 3**, around the latter and the terminals of which are raised to the potentials required for creating the necessary field.

By way of examples of application of this type of embodiment of the invention, the device shown in Fig. 6 has been used with a resistor 3 of 100,000 megohms and a resistor 23 of 1 megohm, and the device shown in Fig. 7 with a resistor 3 of 100,000 megohms and four resistors 26, **26*a*, 26*b*, 26*c***, of one megohm.

What I claim is:

1. An amplifying system comprising an electronic amplifier having input and output connections, a negative feedback circuit connected between said output and input connections through a high value resistor having a substantially rectilinear longitudinal axis and transverse dimensions which are relatively small with respect to the length thereof, said resistor being disposed in series between said feedback circuit and said input connection, two substantially parallel, conductive, flat, annular plates having a central aperture therein through which said resistor, the dimensions of said aperture being slightly larger than the transverse dimensions of the said resistor, said plates being arranged substantially perpendicularly to the axis of said resistor in order to locate the edges of the apertures in said plates close to the said resistor, but without any contact between the plates and the resistor, one of said plates being grounded, a second negative feedback circuit connected between the output connection of said amplifier and the other of said plates, and means for connecting the said plates to sources of potential such that the potential of each plate is substantially the same as the potential of the part of the resistor adjacent to the said plate.

2. An amplifying system comprising an electronic amplifier having input and output connections, a negative feedback circuit connected between said output and input connections through a high value resistor having a substantially rectilinear longitudinal axis and transverse dimensions which are relatively small with respect to the length thereof, said resistor being disposed in series between said feedback circuit and said input connection, two substantially parallel, conductive, flat, circular plates having a central aperture therein through which said resistor extends, the dimensions of said aperture being slightly larger than the transverse dimensions of the said resistor, said plates being arranged substantially perpendicularly to the axis of said resistor and extending substantially beyond the lateral limits of said resistor, in order to locate the edges of the apertures in said plates close to the said resistor, but without any contact between the plates and the resistor, means for varying the distance between said plates, one of said plates being grounded, a second negative feedback circuit connected between the output connection of said amplifier and the other of said plates and means for connecting the said plates to sources of potential such that the potential of each plate is substantially the same as the potential of the part of the resistor adjacent to the said plate.

3. An amplifying system comprising an electronic amplifier having input and output connections, a negative feed-back circuit connected between the said output and input connections through a high value resistor having a substantially rectilinear longitudinal axis and transverse dimensions which are relatively small with respect to the length thereof, said resistor being disposed in series between said feed-back circuit and said input connection, at least two substantially parallel, conductive, flat, annular plates having a central aperture therein through which the said resistor extends, the dimensions of said aperture being slightly larger than the transverse dimensions of the said resistor, the planes of said plates being arranged substantially perpendicular to the axis of said resistor in order to locate the edges of the apertures in the said plates close to the said resistor, but without contact being made between the said plates and the said resistor, means for varying the distance between the said plates, and means for connecting the said plates to sources of potential such that the potential of each plate is substantially the same as the potential of the part of the resistor adjacent the said plate.

4. In an amplifying system comprising an electronic amplifier having input and output connections, a negative feed-back circuit connected between said output and input connections through a high value resistor having a substantially rectilinear longitudinal axis and transverse dimensions which are relatively small with respect to the length thereof, said resistor being disposed in series between said feed-back circuit and said input connection, an external metallic casing, a support of insulating material of cylindrical shape to carry the said resistance, a first flat annular metallic plate having a central opening the dimensions of said opening being slightly larger than the transverse dimensions of the said resistor, means moving axially in the said casing for adjusting the axial position of the said resistor through the opening of the said first plate, a second annular plate similar to the first and held fixed with respect to the said casing, means moving axially in the said casing and connected to the first plate for adjusting the axial position of the said first plate with respect to the resistor and second plate, the said plates being arranged substantially at right angles to the axis of the said resistor in order to locate the internal annular edges of the said plates close to the resistor but without any contact between the plates and the resistor, means for connecting one of the said plates to earth and means for connecting the other plate to a source of potential such that its potential is substantially the same as that of the part of the resistance adjacent to the said plate.

5. An amplifying system as set forth in claim 4, in which the second of said plates is connected to an output connection of a negative feedback circuit having an input connection connected to the output connection of said amplifier.

References Cited in the file of this patent

UNITED STATES PATENTS

| | | |
|---|---|---|
| 1,571,405 | Goldsmith | Feb. 2, 1926 |
| 1,798,012 | Cohen et al. | Mar. 24, 1931 |
| 2,033,274 | Burton | Mar. 10, 1936 |
| 2,245,598 | Llewellyn | June 17, 1941 |
| 2,623,996 | Gray | Dec. 30, 1952 |